(12) United States Patent
Ermoshkin et al.

(10) Patent No.: US 10,792,868 B2
(45) Date of Patent: Oct. 6, 2020

(54) METHOD AND APPARATUS FOR THREE-DIMENSIONAL FABRICATION

(71) Applicant: Carbon3D, Inc., Redwood City, CA (US)

(72) Inventors: Alexander Ermoshkin, Pittsboro, NC (US); Nikita Ermoshkin, Pittsboro, NC (US); Robert K. Pinschmidt, Jr., Carrboro, NC (US); Zachary Polizzi, Weddington, NC (US); Soren Rademacher, Chapel Hill, NC (US); David Shirvanyants, Chapel Hill, NC (US); Edward T. Samulski, Chapel Hill, NC (US)

(73) Assignee: Carbon, Inc., Redwood City, CA (US)

( * ) Notice: Subject to any disclaimer, the term of this patent is extended or adjusted under 35 U.S.C. 154(b) by 76 days.

(21) Appl. No.: 15/255,752

(22) Filed: Sep. 2, 2016

(65) Prior Publication Data

US 2017/0066185 A1    Mar. 9, 2017

Related U.S. Application Data

(60) Provisional application No. 62/216,014, filed on Sep. 9, 2015.

(51) Int. Cl.
*B29C 64/129* (2017.01)
*B29C 67/00* (2017.01)
(Continued)

(52) U.S. Cl.
CPC .......... *B29C 67/007* (2013.01); *B29C 64/129* (2017.08); *B33Y 10/00* (2014.12); *B33Y 30/00* (2014.12)

(58) Field of Classification Search
CPC ..... B29C 67/007; B29C 64/129; B33Y 10/00; B33Y 30/00
See application file for complete search history.

(56) References Cited

U.S. PATENT DOCUMENTS

| 4,544,573 A | 10/1985 | Dobashi et al. |
| 5,122,441 A | 6/1992 | Lawton et al. |
(Continued)

FOREIGN PATENT DOCUMENTS

| DE | 202013103446 | 8/2013 |
| WO | 200172501 | 10/2001 |
(Continued)

OTHER PUBLICATIONS

Dendurkuri et al., Continuous-flow lithography for high-throughput microparticle synthesis, Nature Materials, vol. 5, pp. 365-369, May 2006, published online Apr. 9, 2006.
(Continued)

*Primary Examiner* — Robert S Walters, Jr.
(74) *Attorney, Agent, or Firm* — Myers Bigel, P.A.

(57) ABSTRACT

A method of making a three-dimensional object is carried out by: (a) providing an apparatus comprising a radiation source, a carrier on which the three dimensional object is made, and a movable belt positioned therebetween, the belt having a first surface and an opposite second surface, with the belt comprised of an optically transparent material, and with the belt permeable to a polymerization inhibitor; (b) applying a polymerizable liquid to the first surface of the belt, and contacting the second surface of the belt to the polymerization inhibitor, (c) contacting a portion of the belt first surface having the polymerizable liquid thereon to the carrier or the three dimensional object so that the belt adheres thereto with the polymerizable liquid positioned therebetween; (d) irradiating the polymerizable liquid with actinic radiation through the belt from the radiation source
(Continued)

to polymerize the polymerizable liquid positioned therebetween; then (e) optionally separating the belt from the carrier or the three dimensional object; and then (f) repeating steps (b) through (e) until the three dimensional object is completed. Apparatus for carrying out the method is also described.

12 Claims, 4 Drawing Sheets

(51) Int. Cl.
*B33Y 10/00* (2015.01)
*B33Y 30/00* (2015.01)

(56) References Cited

U.S. PATENT DOCUMENTS

| | | |
|---|---|---|
| 5,143,817 A | 9/1992 | Lawton et al. |
| 5,236,637 A | 8/1993 | Hull |
| 5,247,180 A | 9/1993 | Mitcham et al. |
| 5,269,982 A | 12/1993 | Brotz |
| 5,391,072 A | 2/1995 | Lawton et al. |
| 5,637,169 A | 6/1997 | Hull et al. |
| 5,650,260 A | 7/1997 | Onishi |
| 5,692,859 A | 12/1997 | Dickson et al. |
| 6,429,402 B1 | 8/2002 | Dixon et al. |
| 7,402,273 B2 * | 7/2008 | Sherwood .......... B29C 35/0805 264/308 |
| 7,438,846 B2 | 10/2008 | John |
| 7,467,939 B2 | 12/2008 | Sperry et al. |
| 7,709,544 B2 | 5/2010 | Doyle et al. |
| 7,731,887 B2 | 6/2010 | Hull et al. |
| 7,845,930 B2 | 12/2010 | Shkolnik et al. |
| 7,892,474 B2 | 2/2011 | Shkolnik et al. |
| 7,906,061 B2 | 3/2011 | Partanen et al. |
| 7,931,460 B2 | 4/2011 | Scott et al. |
| 8,110,135 B2 | 2/2012 | El-Siblani |
| 8,226,395 B2 | 7/2012 | Pax et al. |
| 8,372,330 B2 | 2/2013 | El-Siblani et al. |
| 8,668,859 B2 | 3/2014 | Pettis |
| 8,777,602 B2 | 7/2014 | Vermeer et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,360,757 B2 | 6/2016 | Desimone et al. |
| 9,498,920 B2 | 11/2016 | Desimone et al. |
| 9,598,606 B2 | 3/2017 | Rolland et al. |
| 9,676,963 B2 | 6/2017 | Rolland et al. |
| 9,862,146 B2 | 1/2018 | Driessen et al. |
| 9,993,974 B2 | 6/2018 | Desimone et al. |
| 10,016,938 B2 | 7/2018 | Desimone et al. |
| 10,093,064 B2 | 10/2018 | Desimone et al. |
| 10,144,181 B2 | 12/2018 | Desimone et al. |
| 10,150,253 B2 | 12/2018 | Desimone et al. |
| 2008/0054531 A1 | 3/2008 | Kerekes et al. |
| 2008/0169586 A1 * | 7/2008 | Hull .................. B29C 67/0085 264/401 |
| 2008/0171284 A1 | 7/2008 | Hull et al. |
| 2008/0174050 A1 | 7/2008 | Kikuchi |
| 2011/0076495 A1 | 3/2011 | Batchelder et al. |
| 2011/0089610 A1 | 4/2011 | El-Siblani et al. |
| 2012/0007287 A1 | 1/2012 | Vermeer et al. |
| 2013/0075013 A1 | 3/2013 | Chillscyzn et al. |
| 2013/0078325 A1 | 3/2013 | Sperry et al. |
| 2013/0140741 A1 | 6/2013 | El-Siblani et al. |
| 2013/0292862 A1 | 11/2013 | Joyce |
| 2013/0295212 A1 | 11/2013 | Chen et al. |
| 2014/0048980 A1 | 2/2014 | Crump et al. |
| 2014/0191442 A1 | 7/2014 | Elsey |
| 2014/0252684 A1 | 9/2014 | Swanson et al. |
| 2014/0272270 A1 | 9/2014 | Hansen |
| 2014/0353878 A1 | 12/2014 | Driessen et al. |
| 2014/0361463 A1 | 12/2014 | DeSimone et al. |
| 2015/0034007 A1 | 2/2015 | Fischer et al. |
| 2015/0072293 A1 | 3/2015 | DeSimone et al. |
| 2015/0097315 A1 | 4/2015 | Desimone et al. |
| 2015/0231828 A1 | 8/2015 | El-Siblani et al. |
| 2015/0231831 A1 | 8/2015 | El-Siblani et al. |
| 2015/0331402 A1 | 11/2015 | Lin et al. |
| 2015/0360419 A1 | 12/2015 | Willis et al. |
| 2017/0066185 A1 | 3/2017 | Ermoshkin et al. |
| 2017/0129167 A1 | 5/2017 | Castanon |
| 2017/0129169 A1 | 5/2017 | Batchelder et al. |

FOREIGN PATENT DOCUMENTS

| | | |
|---|---|---|
| WO | 2010/074566 | 7/2010 |
| WO | 2011086450 | 7/2011 |
| WO | WO 2014/108473 | 7/2014 |
| WO | WO 2015/080888 | 6/2015 |
| WO | WO 2015/107066 | 7/2015 |
| WO | WO 2015/142546 | 9/2015 |
| WO | WO 2015/164234 | 10/2015 |
| WO | WO 2015/195909 | 12/2015 |
| WO | WO 2015/195920 | 12/2015 |
| WO | WO 2015/195924 | 12/2015 |
| WO | WO 2015/200173 | 12/2015 |
| WO | WO 2015/200179 | 12/2015 |
| WO | WO 2015/200189 | 12/2015 |
| WO | WO 2015/200201 | 12/2015 |

OTHER PUBLICATIONS

Dendukuri et al., Stop-flow lithography in a microfluidic device, Lab Chip, 2007, 7, 818-828, published online May 21, 2007.
Dendurkuri et al., Modeling of Oxygen-Inhibited Free Radical Photopolymerization in PDMS Microfluidic Device, Macromolecules, 2008, 41 (22), 8547-8556, published Oct. 21, 2008.
Yasuda et al., Permeability of Polymer Membranes to Dissolved Oxygen, pp. 1314-1316 (1966) Journal of Polymer Science, vol. 4.
Stern, S.A., The 'Barrer' Permeability Unit, pp. 1933-1934 (1968) Journal of Polymer Science, Part A-2, vol. 6.
Morelli, Dean. Protest to Canadian Patent Applications by Joseph DeSimone et al. Regarding Continuous Liquid Interphase Printing. Canadian patent applications CA2898098A1, CA 2898103A1, and CA2898106A1. Dec. 31, 2015. Canadian Intellectual Property Office, 37 pp.
Y. Pan et al., J. Manufacturing Sci. and Eng. 134, 051011-1 (Oct. 2012).
J. Tumbleston et al., Continuous liquid interface production of 3d objects, Science 347, 1349-1352 (published online Mar. 16, 2015).

* cited by examiner

Figure 1: Schematic illustration of method and apparatus.

Figure 2: Perspective view of one embodiment of apparatus.

Figure 3: CAD model (left) and parts produced (right).

Figure 4: Single-Pass (left) and Multi-Pass (right) deposition patterns.

METHOD AND APPARATUS FOR THREE-DIMENSIONAL FABRICATION

RELATED APPLICATIONS

This application claims the benefit of U.S. Provisional Patent Application Ser. No. 62/216,014, filed Sep. 9, 2015, the disclosure of which is incorporated by reference herein in its entirety.

FIELD OF THE INVENTION

The present invention concerns methods and apparatus for the fabrication of three-dimensional objects, particularly larger objects, from hardenable materials.

BACKGROUND OF THE INVENTION

Production of large objects such as automotive parts by additive manufacturing techniques has been challenging.

Some approaches, such as "bottom up" three-dimensional fabrication, require resin to flow longer distances through the narrow space between the growing object and the resin source during fabrication of larger objects: A particular problem with viscous resins and solid objects.

Other approaches, such as "top down" three-dimensional fabrication, require larger objects to be lowered into larger baths or reservoirs of the resin during fabrication: A particular problem with resins that are expensive, and/or have a relatively short "pot life."

U.S. Pat. No. 5,247,180 to Mitcham describes a stereolithography apparatus in which an object is lowered into a vat of polymerizable liquid, with the device employing a movable exposure head that travels across the surface of a growing object to allow fabrication of larger objects. This, however, does not solve the problem of placing large amounts of potentially expensive, and in some cases short pot-life, materials in a large vat or open space (see also L. Goreta, PCT Application WO 1995/15841, and A. Allanic, PCT Application WO 2014/108473). Accordingly, there is a need for new approaches to additive manufacturing that are readily adaptable to the production of larger objects.

SUMMARY OF THE INVENTION

Accordingly, the present invention provides a method of making a three-dimensional object, comprising:

(a) providing an apparatus comprising a radiation source, a carrier on which the three dimensional object is made, and a movable belt positioned therebetween, the belt having a first surface and an opposite second surface, with the belt comprised of an optically transparent material, and with the belt permeable to a polymerization inhibitor;

(b) applying a polymerizable liquid to the first surface of the belt, and contacting the second surface of the belt to the polymerization inhibitor, (c) contacting a portion of the belt first surface having the polymerizable liquid thereon to the carrier or the three dimensional object so that the belt adheres thereto with the polymerizable liquid positioned therebetween;

(d) irradiating the polymerizable liquid with actinic radiation through the belt from the radiation source to polymerize the polymerizable liquid positioned therebetween, and/or while:

(i) moving the radiation source lengthwise across the substrate or the three-dimensional object (e.g., while the belt is in static contact with the carrier or object; that is, does not slide);

(ii) continuously adhering a leading edge portion of the belt to the carrier or the object;

(iii) continuously peeling a trailing edge portion of the belt from the carrier or the object, with (iv) the polymerization inhibitor passing through the belt to form an active surface on the object (e.g., which active surface persists after separating step (e) and new contact (c) is made, to facilitate continuous covalent coupling of newly deposited material to previously deposited material), and optionally, a dead zone of unpolymerized liquid between the active surface and the polymerizable liquid; then (e) optionally separating the belt from the carrier or the three dimensional object (e.g., to begin re-applying the polymerizable liquid to the belt); and then (f) repeating steps (b) through (e) until the three dimensional object is completed.

A further aspect of the invention is an apparatus useful for making a three-dimensional object, comprising:

(a) a radiation source, (b) a carrier on which the three dimensional object is made;

(c) a movable belt positioned between the carrier and the radiation source, the belt having a first surface and an opposite second surface, with the belt comprised of an optically transparent material, and with the belt permeable to a polymerization inhibitor;

(d) an applicator assembly operably associated with the belt and configured to apply a polymerizable liquid thereto;

(e) a frame, with the belt and the radiation source connected to the frame, and with the frame defining a contact region in which the belt contacts the carrier or object;

(f) a first drive assembly interconnecting the movable belt and the frame;

(g) a second drive assembly interconnecting the frame and the carrier.

In some embodiments, the radiation source, movable belt, applicator assembly, first drive assembly, and frame are provided separately from the carrier and the second drive assembly, as a "head assembly" which may be mounted to a carrier and associated drives (e.g., mounted or retrofitted to a CNC machine)

Non-limiting examples and specific embodiments of the present invention are explained in greater detail in the drawings herein and the specification set forth below. The disclosure of all United States Patent references cited herein are to be incorporated herein by reference in their entirety.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Polymerizable Liquids.

Any suitable polymerizable liquid that includes a component that is cured by actinic radiation or light, particularly UV light, may be used to carry out the present invention. In some embodiments, the polymerizable liquid may be a "dual cure" polymerizable liquid that additionally includes components that are cured by a different mechanism (heat, microwave irradiation, light at a different wavelength, etc.). Where a second cure is employed after a "green" part is initially fabricated, in some embodiments reaction products of the first cure may serve as reactants, or precursors, for the second cure.

In some embodiments, the polymerizable liquid has a limited "pot life:" That is, constituents begin to react within one or two hours, under conditions in which the polymerizable liquid is used.

In some embodiments, the polymerizable liquid has a high viscosity: For example, a viscosity of 1,000 or 2,000 centipoise or more, or even a viscosity of 10,000 or 20,000 centipoise or more, under conditions in which the method is carried out.

Examples of suitable polymerizable liquids include, but are not limited to, those described in US Patent Application Publication No. 2015/0102532 to DeSimone et al.

In general, when the polymerizable liquid comprises a free radical polymerizable liquid, the inhibitor may be oxygen (e.g., atmospheric oxygen). When the first polymerizable liquid comprises an acid-catalyzed or cationically polymerizable liquid, and the inhibitor may comprise a base.

Additional examples of polymerizable liquids that may be used to carry out the present invention include, but are not limited to, the dual cure polymerizable liquids discussed further below.

2. Apparatus.

As noted above, an apparatus useful for making a three-dimensional object, as described herein may comprise (see, e.g., FIGS. 1-2 and 5-6):

(a) a radiation source, typically an actinic radiation source (e.g., a light source, such as an ultraviolet light source 11);

(b) a carrier or "build platform" 15 on which the three dimensional object is made;

(c) a movable belt or film 13 positioned between the carrier and the radiation source, the belt having a first surface and an opposite second surface, with the belt comprised of an optically transparent material, and with the belt permeable to a polymerization inhibitor (e.g. atmospheric oxygen);

(d) an applicator assembly operably associated with the belt and configured to apply a polymerizable liquid thereto;

(e) a frame 16, with the belt and the radiation source connected to the frame, and with the frame defining a contact region in which the belt contacts the carrier or object;

(f) a first drive assembly interconnecting the movable belt and the frame; and (g) a second drive assembly interconnecting the frame and the carrier.

The moving belt may be continuous or discontinuous (that is, reversible in direction, being alternately taken up and unwound from a spool or roller). The moving belt is generally formed of a material that is flexible, optically transparent or transparent to the actinic radiation (e.g., ultraviolet light), and permeable to the inhibitor of polymerization (e.g., atmospheric oxygen). In some embodiments, the belt is formed of a fluoropolymer.

In general, the moving belt is configured (e.g., by mounting on rollers 12 or the like) to pass through a contact region (e.g., defined by a leading edge portion and a trailing peeling edge portion) which contact region is in fixed contact (e.g., non-slipping contact) with the carrier or the object. Note that the contact region has a length dimension less than that of the carrier or the object.

Any suitable applicator assembly may be used, including but not limited to rollers, sprayers 22, blades, baths, and combinations thereof. In some embodiments the applicator assembly comprises a plurality of independently controllable spray orifices, such as an ink-jet spray head or cartridge.

Control systems and associated wiring are not shown in the Figures for clarity, but may be implemented in accordance with known techniques.

3. Methods.

A method of making a three-dimensional object may be carried out with apparatus such as described above by:

(a) providing an apparatus comprising a radiation source, a carrier on which the three dimensional object is made, and a movable belt positioned therebetween, the belt having a first surface and an opposite second surface, with the belt comprised of an optically transparent material, and with the belt permeable to a polymerization inhibitor (e.g., atmospheric oxygen);

(b) applying a polymerizable liquid to the first surface of the belt, and contacting the second surface of the belt to the polymerization inhibitor, (c) contacting a portion of the belt first surface having the polymerizable liquid thereon to the carrier or the three dimensional object so that the belt adheres thereto with the polymerizable liquid positioned therebetween;

(d) irradiating the polymerizable liquid with actinic radiation through the belt from the radiation source to polymerize the polymerizable liquid positioned therebetween, and or while:

(i) moving the radiation source lengthwise across the substrate or the three-dimensional object (e.g., while the belt is in static contact with the carrier or object; that is, does not slide);

(ii) continuously adhering a leading edge portion of the belt to the carrier or the object;

(iii) continuously peeling a trailing edge portion of the belt from the carrier or the object, with (iv) the polymerization inhibitor passing through the belt to form an active surface on the object (e.g., which active surface persists after separating step (e) and new contact (c) is made, to facilitate continuous covalent coupling of newly deposited material to previously deposited material), and optionally, a dead zone of unpolymerized liquid between the active surface and the polymerizable liquid; then (e) optionally separating the belt from the carrier or the three dimensional object (e.g., to begin re-applying the polymerizable liquid to the belt); and then (f) repeating steps (b) through (e) until the three dimensional object is completed.

The irradiating step may be carried out with patterned actinic radiation, to produce the three dimensional object in accordance with known techniques. However, in some embodiments, the irradiating may simply be "flood" irradiation, and the configuration of the three dimensional object achieved by patterned coating of the belt with the polymerizable liquid (e.g., by patterned spray from a plurality of spray orifices, such as patterned spray application with an ink jet spray assembly). In still other embodiments, both patterned actinic radiation, and patterned coating of the belt, may be employed in combination with one another.

The separating step (e) may be carried out by (i) advancing the belt contact region lengthwise beyond the carrier or the three dimensional object, and then (ii) advancing the belt contact region and the carrier or the three dimensional object in the height dimension.

In some embodiments, the repeating step (f) may be carried out by repeatedly reversing the direction of travel of the belt and radiation source. In this case, complete separation may not be required, as a trailing edge (to then become the leading edge after reversal of direction) may remain in contact with the object. This embodiment may be desirable where the belt is not "endless" or continuous, but is taken up and unwound from various spools or reels. In other embodiments (which may be employed when the belt is continuous), the repeating step may be carried out by (f) is carried out by (i) lifting or spacing the belt above the three dimensional object; (ii) moving the belt and radiation source lengthwise across the three dimensional object without contacting the same to return the belt and radiation source to a start position; and (iii) repeating steps (b) through (e) in the same direction of travel as in the previous repetition of steps (b) through (e) In either case, the repeating step may include laterally shifting the belt and radiation source with respect to the direction of travel prior to repeating steps (b) through (e), to obtain exposure of larger surface areas on the object by a belt having a lesser width.

In some embodiments, the belt is electrostatically charged, and/or the applying step is carried out by electrospray.

In some embodiments, the belt may be pressed against the carrier or the object (e.g., with an optically transparent pressure plate positioned between the belt and carrier or three dimensional object) to promote uniform coating of the object with the polymerizable liquid.

While the carrier and belt may be repeatedly re-positioned with respect to one another during the fabrication of the three-dimensional object, it may be desirable in some embodiments to co-fabricate a sacrificial leading bumper and/or sacrificial trailing bumper on the carrier, along with the object (for example, where tolerances are close and re-alignment of the belt with the growing object may be required). Such bumpers may be in any suitable shape, such as in the shape of a ramp. The bumpers may be fabricated of the same material as the object, or, through the use of multiple selectable spray orifices or the like applying different polymerizable liquids to different regions of the belt, be fabricated from different materials as the object. The bumpers may be "over exposed" during fabrication so that they are harder than the object itself, and/or layered.

4A. Dual Cure Polymerizable Liquids: Part A.

Dual cure systems as described herein may include a first curable system (sometimes referred to as "Part A" or herein) that is curable by actinic radiation, typically light, and in some embodiments ultraviolet (UV) light). Any suitable polymerizable liquid can be used as the first component. The liquid (sometimes also referred to as "liquid resin" "ink," or simply "resin" herein) can include a monomer, particularly photopolymerizable and/or free radical polymerizable monomers, and a suitable initiator such as a free radical initiator, and combinations thereof. Examples include, but are not limited to, acrylics, methacrylics, acrylamides, styrenics, olefins, halogenated olefins, cyclic alkenes, maleic anhydride, alkenes, alkynes, carbon monoxide, functionalized oligomers, multifunctional cure site monomers, functionalized PEGs, etc., including combinations thereof. Examples of liquid resins, monomers and initiators include but are not limited to those set forth in U.S. Pat. Nos. 8,232,043; 8,119,214; 7,935,476; 7,767,728; 7,649,029; WO 2012129968 A1; CN 102715751 A; JP 2012210408 A.

Acid catalyzed polymerizable liquids.

While in some embodiments as noted above the polymerizable liquid comprises a free radical polymerizable liquid (in which case an inhibitor may be oxygen as described below), in other embodiments the polymerizable liquid comprises an acid catalyzed, or cationically polymerized, polymerizable liquid. In such embodiments the polymerizable liquid comprises monomers contain groups suitable for acid catalysis, such as epoxide groups, vinyl ether groups, etc. Thus suitable monomers include olefins such as methoxyethene, 4-methoxystyrene, styrene, 2-methylprop-1-ene, 1,3-butadiene, etc.; heterocyclic monomers (including lactones, lactams, and cyclic amines) such as oxirane, thietane, tetrahydrofuran, oxazoline, 1,3, dioxepane, oxetan-2-one, etc., and combinations thereof. A suitable (generally ionic or non-ionic) photoacid generator (PAG) is included in the acid catalyzed polymerizable liquid, examples of which include, but are not limited to onium salts, sulfonium and iodonium salts, etc., such as diphenyl iodide hexafluorophosphate, diphenyl iodide hexafluoroarsenate, diphenyl iodide hexafluoroantimonate, diphenyl p-methoxyphenyl triflate, diphenyl p-toluenyl triflate, diphenyl p-isobutylphenyl triflate, diphenyl p-tert-butylphenyl triflate, triphenylsulfonium hexafluorophosphate, triphenylsulfonium hexafluoroarsenate, triphenylsulfonium hexafluoroantimonate, triphenylsulfonium triflate, dibutylnaphthylsulfonium triflate, etc., including mixtures thereof. See, e.g., U.S. Pat. Nos. 7,824,839; 7,550,246; 7,534,844; 6,692,891; 5,374,500; and 5,017,461; see also *Photoacid Generator Selection Guide for the electronics industry and energy curable coatings* (BASF 2010).

Hydrogels.

In some embodiments suitable resins includes photocurable hydrogels like poly(ethylene glycols) (PEG) and gelatins. PEG hydrogels have been used to deliver a variety of biologicals, including Growth factors; however, a great challenge facing PEG hydrogels crosslinked by chain growth polymerizations is the potential for irreversible protein damage. Conditions to maximize release of the biologicals from photopolymerized PEG diacrylate hydrogels can be enhanced by inclusion of affinity binding peptide sequences in the monomer resin solutions, prior to photopolymerization allowing sustained delivery. Gelatin is a biopolymer frequently used in food, cosmetic, pharmaceutical and photographic industries. It is obtained by thermal denaturation or chemical and physical degradation of collagen. There are three kinds of gelatin, including those found in animals, fish and humans. Gelatin from the skin of cold water fish is considered safe to use in pharmaceutical applications. UV or visible light can be used to crosslink appropriately modified gelatin. Methods for crosslinking gelatin include cure derivatives from dyes such as Rose Bengal.

Photocurable Silicone Resins.

A suitable resin includes photocurable silicones. UV cure silicone rubber, such as Siliopren™ UV Cure Silicone Rubber can be used as can LOCTITE™ Cure Silicone adhesives sealants. Applications include optical instruments, medical and surgical equipment, exterior lighting and enclosures, electrical connectors/sensors, fiber optics and gaskets.

Biodegradable Resins.

Biodegradable resins are particularly important for implantable devices to deliver drugs or for temporary performance applications, like biodegradable screws and stents (U.S. Pat. Nos. 7,919,162; 6,932,930). Biodegradable copolymers of lactic acid and glycolic acid (PLGA) can be dissolved in PEG dimethacrylate to yield a transparent resin suitable for use. Polycaprolactone and PLGA oligomers can be functionalized with acrylic or methacrylic groups to allow them to be effective resins for use.

Photocurable Polyurethanes.

A particularly useful resin is photocurable polyurethanes (including, polyureas, and copolymers of polyurethanes and polyureas (e.g., poly(urethane-urea)). A photopolymerizable polyurethane/polyurea composition comprising (1) a polyurethane based on an aliphatic diisocyanate, poly(hexamethylene isophthalate glycol) and, optionally, 1,4-butanediol; (2) a polyfunctional acrylic ester; (3) a photoinitiator; and (4) an anti-oxidant, can be formulated so that it provides a hard, abrasion-resistant, and stain-resistant material (U.S. Pat. No. 4,337,130). Photocurable thermoplastic polyurethane elastomers incorporate photoreactive diacetylene diols as chain extenders.

Additionally photocurable urethane acrylate resins are particularly useful. These resins comprise an oligomeric diol, for example, poly (tetramethylene oxide) diol, that is first end-capped with a diisocyanate, for example isophorone diisocyanate. This resulting prepolymer is made photocurable by subsequent reaction with a monomer containing both a vinyl functionality and a second functional group that will react with an isocyanate. For example, 2-hydroxy ethyl acrylate can be added to the prepolymer to yield a photocurable urethane acrylate. A variety of materials can be made by varying the diol composition and molecular weight, the isocyanate composition and ratio to the diol, and the composition of the reactive monomer. Optionally, these urethane acrylates can be blended with a reactive diluent, isobornyl acrylate, for example, to lower viscosity and further adjust properties.

High Performance Resins.

In some embodiments, high performance resins are used. Such high performance resins may sometimes require the use of heating to melt and/or reduce the viscosity thereof, as noted above and discussed further below. Examples of such resins include, but are not limited to, resins for those materials sometimes referred to as liquid crystalline polymers of esters, ester-imide, and ester-amide oligomers, as described in U.S. Pat. Nos. 7,507,784; 6,939,940. Since such resins are sometimes employed as high-temperature thermoset resins, in the present invention they further comprise a suitable photoinitiator such as benzophenone, anthraquinone, and fluorenone initiators (including derivatives thereof), to initiate cross-linking on irradiation, as discussed further below.

Additional Example Resins.

Particularly useful resins for dental applications include EnvisionTEC's Clear Guide, EnvisionTEC's E-Denstone Material. Particularly useful resins for hearing aid industries include EnvisionTEC's e-Shell 300 Series of resins. Particularly useful resins include EnvisionTEC's HTM140IV High Temperature Mold Material for use directly with vulcanized rubber in molding/casting applications. A particularly useful material for making tough and stiff parts includes EnvisionTEC's RC31 resin. Particularly useful resin for investment casting applications include EnvisionTEC's Easy Cast EC500 resin and MadeSolid FireCast resin.

Additional Resin Ingredients.

The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 um average diameter).

The particles can comprise an active agent or detectable compound as described below, though these may also be provided dissolved solubilized in the liquid resin as also discussed below. For example, magnetic or paramagnetic particles or nanoparticles can be employed.

The liquid resin can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Non-Reactive Light Absorbers.

In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, hydroxypenyltriazine, and/or benzotriazole ultraviolet light absorber (e.g., Mayzo BLS1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Inhibitors of Polymerization.

Inhibitors or polymerization inhibitors for use in the present invention may be in the form of a liquid or a gas. In some embodiments, gas inhibitors are preferred. The specific inhibitor will depend upon the monomer being polymerized and the polymerization reaction. For free radical polymerization monomers, the inhibitor can conveniently be oxygen, which can be provided in the form of a gas such as air, a gas enriched in oxygen (optionally but in some embodiments preferably containing additional inert gases to reduce combustibility thereof), or in some embodiments pure oxygen gas. In alternate embodiments, such as where the monomer is polymerized by photoacid generator initiator, the inhibitor can be a base such as ammonia, trace amines (e.g. methyl amine, ethyl amine, di and trialkyl amines such as dimethyl amine, diethyl amine, trimethyl amine, triethyl amine, etc.), or carbon dioxide, including mixtures or combinations thereof.

Polymerizable Liquids Carrying Live Cells.

In some embodiments, the polymerizable liquid may carry live cells as "particles" therein. Such polymerizable liquids are generally aqueous, and may be oxygenated, and may be considered as "emulsions" where the live cells are the discrete phase. Suitable live cells may be plant cells (e.g., monocot, dicot), animal cells (e.g., mammalian, avian, amphibian, reptile cells), microbial cells (e.g., prokaryote, eukaryote, protozoal, etc.), etc. The cells may be of differentiated cells from or corresponding to any type of tissue (e.g., blood, cartilage, bone, muscle, endocrine gland, exocrine gland, epithelial, endothelial, etc.), or may be undifferentiated cells such as stem cells or progenitor cells. In such embodiments the polymerizable liquid can be one that forms a hydrogel, including but not limited to those described in U.S. Pat. Nos. 7,651,683; 7,651,682; 7,556,490; 6,602,975; 5,836,313; etc.

In some embodiments, polymerizable liquids used in the present invention include a non-reactive pigment or dye. Examples include, but are not limited to, (i) titanium dioxide (e.g., in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, hydroxypenyltriazine, and/or benzotriazole ultraviolet light absorber (e.g. in an amount of 0.001 or 0.005 to 1, 2 or 4 percent by weight).

4B. Dual Cure Polymerizable Liquids: Part B.

As noted above, in some embodiments of the invention, the polymerizable liquid comprises a first light polymerizable component (sometimes referred to as "Part A" herein) and a second component that solidifies by another mechanism, or in a different manner from, the first component (sometimes referred to as "Part B" herein), typically by further reacting, polymerizing, or chain extending. Numerous embodiments thereof may be carried out. In the following, note that, where particular acrylates such as methacrylates are described, other acrylates may also be used.

Part A Chemistry.

As noted above, in some embodiments of the present invention, a resin will have a first component, termed "Part A." Part A comprises or consists of a mix of monomers and/or prepolymers that can be polymerized by exposure to actinic radiation or light. This resin can have a functionality of 2 or higher (though a resin with a functionality of 1 can also be used when the polymer does not dissolve in its monomer). A purpose of Part A is to "lock" the shape of the object being formed or create a scaffold for the one or, more additional components (e.g., Part B). Importantly, Part A is present at or above the minimum quantity needed to maintain the shape of the object being formed after the initial solidification. In some embodiments, this amount corresponds to less than ten, twenty, or thirty percent by weight of the total resin (polymerizable liquid) composition.

In some embodiments, Part A can react to form a cross-linked polymer network or a solid homopolymer.

Examples of suitable reactive end groups suitable for Part A constituents, monomers, or prepolymers include, but are not limited to: acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

An aspect of the solidification of Part A is that it provides a scaffold in which a second reactive resin component, termed "Part B," can solidify during a second step (which may occur concurrently with or following the solidification of Part A). This secondary reaction preferably occurs without significantly distorting the original shape defined during the solidification of Part A. Alternative approaches would lead to a distortion in the original shape in a desired manner.

In particular embodiments, when used in the methods and apparatus described herein, the solidification of Part A is continuously inhibited during printing within a certain region, by oxygen or amines or other reactive species, to form a liquid interface between the solidified part and an inhibitor-permeable film or window (e.g., is carried out by continuous liquid interphase/interface printing).

Part B Chemistry.

Part B may comprise, consist of or consist essentially of a mix of monomers and/or prepolymers that possess reactive end groups that participate in a second solidification reaction after the Part A solidification reaction. In some embodiments, Part B could be added simultaneously to Part A so it is present during the exposure to actinide radiation, or Part B could be infused into the object made during the 3D printing process in a subsequent step. Examples of methods used to solidify Part B include, but are not limited to, contacting the object or scaffold to heat, water or water vapor, light at a different wavelength than that at which Part A is cured, catalysts, (with or without additional heat), evaporation of a solvent from the polymerizable liquid (e.g., using heat, vacuum, or a combination thereof), microwave irradiation, etc., including combinations thereof.

Examples of suitable reactive end group pairs suitable for Part B constituents, monomers or prepolymers include, but are not limited to: epoxy/amine, epoxy/hydroxyl, oxetane/amine, oxetane/alcohol, isocyanate*/hydroxyl, Isocyanate*/amine, isocyanate/carboxylic acid, anhydride/amine, amine/carboxylic acid, amine/ester, hydroxyl/carboxylic acid, hydroxyl/acid chloride, amine/acid chloride, vinyl/Si—H (hydrosilylation), Si—Cl/hydroxyl, Si—Cl/amine, hydroxyl/aldehyde, amine/aldehyde, hydroxymethyl or alkoxymethyl amide/alcohol, aminoplast, alkyne/Azide (also known as one embodiment of "Click Chemistry," along with additional reactions including thiolene, Michael additions, Diels-Alder reactions, nucleophilic substitution reactions, etc.), alkene/Sulfur (polybutadiene vulcanization), alkene/thiol, alkyne/thiol, hydroxyl/halide, isocyanate*/water (polyurethane foams), Si—OH/hydroxyl, Si—OH/water, Si—OH/Si—H (tin catalyzed silicone), Si—OH/Si—OH (tin catalyzed silicone), Perfluorovinyl (coupling to form perfluorocyclobutane), etc., where *Isocyanates include protected isocyanates (e.g. oximes)), diene/dienophiles for Diels-Alder reactions, olefin metathesis polymerization, olefin polymerization using Ziegler-Natta catalysis, ring-opening polymerization (including ring-opening olefin metathesis polymerization, lactams, lactones, Siloxanes, epoxides, cyclic ethers, imines, cyclic acetals, etc.), etc.

Other reactive chemistries suitable for Part B will be recognizable by those skilled in the art. Part B components useful for the formation of polymers described in "Concise Polymeric Materials Encyclopedia" and the "Encyclopedia of Polymer Science and Technology" are hereby incorporated by reference.

Elastomers.

A particularly useful embodiment for implementing the invention is for the formation of elastomers. Tough, high-elongation elastomers are difficult to achieve using only liquid UV-curable precursors. However, there exist many thermally cured materials (polyurethanes, silicones, natural rubber) that result in tough, high-elongation elastomers after curing. These thermally curable elastomers on their own are generally incompatible with most 3D printing techniques.

In embodiments of the current invention, small amounts (e.g., less than 20 percent by weight) of a low-viscosity UV curable material (Part A) are blended with thermally-curable precursors to form (preferably tough) elastomers (e.g. polyurethanes, polyureas, or copolymers thereof (e.g., poly(urethane-urea)), and silicones) (Part B). The UV curable component is used to solidify an object into the desired shape using 3D printing as described herein and a scaffold for the elastomer precursors in the polymerizable liquid. The object can then be heated after printing, thereby activating the second component, resulting in an object comprising the elastomer.

Adhesion of Formed Objects.

In some embodiments, it may be useful to define the shapes of multiple objects using the solidification of Part A, align those objects in a particular configuration, such that there is a hermetic seal between the objects, then activate the secondary solidification of Part B. In this manner, strong adhesion between parts can be achieved during production. A particularly useful example may be in the formation and adhesion of sneaker components.

Fusion of Particles as Part B.

In some embodiments, "Part B" may simply consist of small particles of a pre-formed polymer. After the solidification of Part A, the object may be heated above the glass transition temperature of Part B in order to fuse the entrapped polymeric particles.

Evaporation of Solvent as Part B.

In some embodiments, "Part B" may consist of a pre-formed polymer dissolved in a solvent. After the solidification of Part A into the desired object, the object is subjected to a process (e.g. heat+vacuum) that allows for evaporation of the solvent for Part B, thereby solidifying Part B.

Thermally Cleavable End Groups.

In some embodiments, the reactive chemistries in Part A can be thermally cleaved to generate a new reactive species after the solidification of Part A. The newly formed reactive species can further react with Part B in a secondary solidification. An exemplary system is described by Velankar, Pezos and Cooper, *Journal of Applied Polymer Science*, 62, 1361-1376 (1996). Here, after UV-curing, the acrylate/methacrylate groups in the formed object are thermally cleaved to generated diisocyanate prepolymers that further react with blended chain-extender to give high molecular weight polyurethanes/polyureas within the original cured material or scaffold. Such systems are, in general, dual-hardening systems that employ blocked or reactive blocked prepolymers, as discussed in greater detail below. It may be noted that later work indicates that the thermal cleavage above is actually a displacement reaction of the chain extender (usually a diamine) with the hindered urea, giving the final polyurethanes/polyureas without generating isocyanate intermediates.

Methods of Mixing Components.

In some embodiments, the components may be mixed in a continuous manner prior to being introduced to the printer build plate. This may be done using multi-barrel syringes and mixing nozzles. For example, Part A may comprise or consist of a UV-curable di(meth)acrylate resin, Part B may comprise or consist of a diisocyanate prepolymer and a polyol mixture. The polyol can be blended together in one barrel with Part A and remain unreacted. A second syringe barrel would contain the diisocyanate of Part B. In this manner, the material can be stored without worry of "Part B" solidifying prematurely. Additionally, when the resin is introduced to the printer in this fashion, a constant time is defined between mixing of all components and solidification of Part A.

Other Additive Manufacturing Techniques.

It will be clear to those skilled in the art that the materials described in the current invention will be useful in other additive manufacturing techniques including fused deposition modeling (FDM), solid laser sintering (SLS), and Ink jet methods. For example, a melt-processed acrylonitrile-butadiene-styrene resin may be formulated with a second UV-curable component that can be activated after the object is formed by FDM. New mechanical properties could be achieved in this manner. In another alternative, melt-processed unvulcanized rubber is mixed with a vulcanizing agent such as sulfur or peroxide, and the shape set through FDM, then followed by a continuation of vulcanization.

5. Dual Cure Polymerizable Liquids Employing Blocked Constituents and Thermally Cleavable Blocking Groups.

In some embodiments, where the solidifying and/or curing step (d) is carried out subsequent to the irradiating step (e.g., by heating or microwave irradiating); the solidifying and/or curing step (d) is carried out under conditions in which the solid polymer scaffold degrades and forms a constituent necessary for the polymerization of the second component (e.g., a constituent such as (i) a prepolymer, (ii) a diisocyanate or polyisocyanate, and/or (iii) a polyol and/or diol, where the second component comprises precursors to a polyurethane/polyurea resin). Such methods may involve the use of reactive or non-reactive blocking groups on or coupled to a constituent of the first component, such that the constituent participates in the first hardening or solidifying event, and when de-protected (yielding free constituent and free blocking groups or blocking agents) generates a free constituent that can participate in the second solidifying and/or curing event. Examples of such dual cure resins include, but are not limited to, those set forth in Jason P. Rolland et al., Three dimensional objects produced from materials having multiple mechanisms of hardening, U.S. Patent Application Pub. No. 2016016077 (9 Jun. 2016) (also published as PCT Patent Application Pub. No. WO2015/200189); Jason P. Rolland et al., Methods of producing three dimensional objects from materials having multiple mechanisms of hardening U.S. Patent Application Pub. No. 20160136889 (19 May 2016) (also published as PCT Patent Application Pub. No. WO2015/200173); Jason P. Rolland et al., Methods of producing polyurethane three-dimensional objects from materials having multiple mechanisms of hardening U.S. Patent Application Pub. No. 20160137838 (19 May 2016) (also published as PCT Patent Application Pub. No. WO2015/200179); and Jason P. Rolland et al., Polyurethane resins having multiple mechanisms of hardening for use in producing three-dimensional objects U.S. Patent Application Pub. No. 20160137839 (19 May 2016) (also published as PCT Patent Application Pub. No. WO2015/200201), the disclosures of all of which are incorporated by reference herein in their entirety.

The present invention is explained in greater detail in the non-limiting Examples set forth below.

Example 1

Example Apparatus

A first embodiment of an apparatus (FIG. 2) of the invention was built around a "Rep-Rap" frame 16, which provides single-axis motion of the build platform 15, and up-down motion for the light source 11, belt 13, and a roller assembly 12 on which a belt is mounted. The belt was created from a TEFLON® fluorinated ethylene propylene film, CS Hyde Item No. 23-3FEP-24 (CS Hyde Co., 1351 N. Milwaukee Ave., Lake Villa, Ill. 60046 USA). The roller assembly included a set of stepper motors and rollers which cause the belt to roll along the assembly. A WINTECH PRO4500 ultraviolet digital light projector (available from Wintech Digital Systems Technology Corp., 2888 Loker Ave. East, STE210C, Carlsbad, Calif. 92010 USA), was mounted onto the assembly, projecting an image onto the belt window formed by the orientation of the belt and the roller assembly. In this embodiment, resin is applied to the part manually before rolling the film over the part and exposing each layer; however, this can be automated with addition of an applicator such as a roller, sprayer (e.g., ink-jet spray head), blade, bath, or combination thereof, or other suitable applicator, as described earlier, and discussed further below.

Example 2

Fabrication of Three-Dimensional Objects

A UV-curable resin comprised of 76 parts Sartomer CN2920, 5 parts isobornyl acrylate, 19 parts cyclohexanedimethanol divinyl ether, 0.5 parts Irgacure 819 photoinitiator, 0.04 parts Wikoff SCUV 14607 Black, and 0.16 parts Wikoff SCUV 14611 White was provided.

Figure 1:
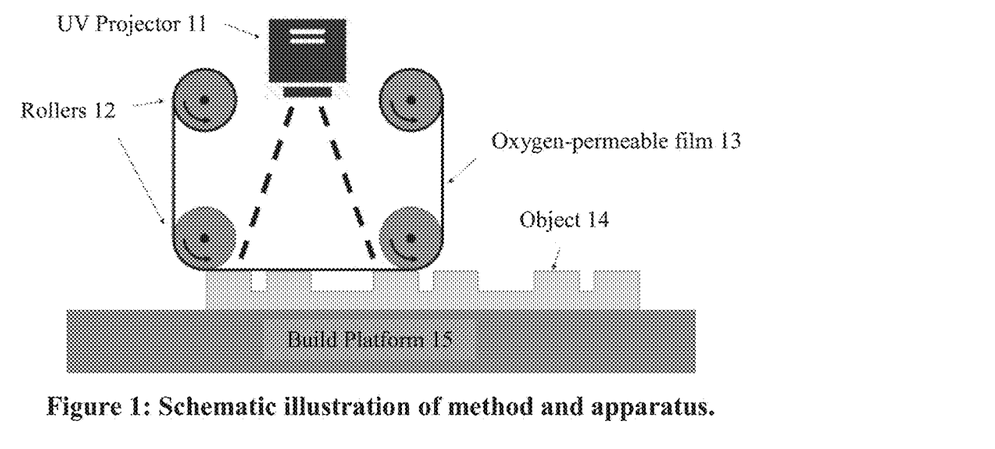
FIG. 1: Schematic illustration of method and apparatus.
Figure 2:
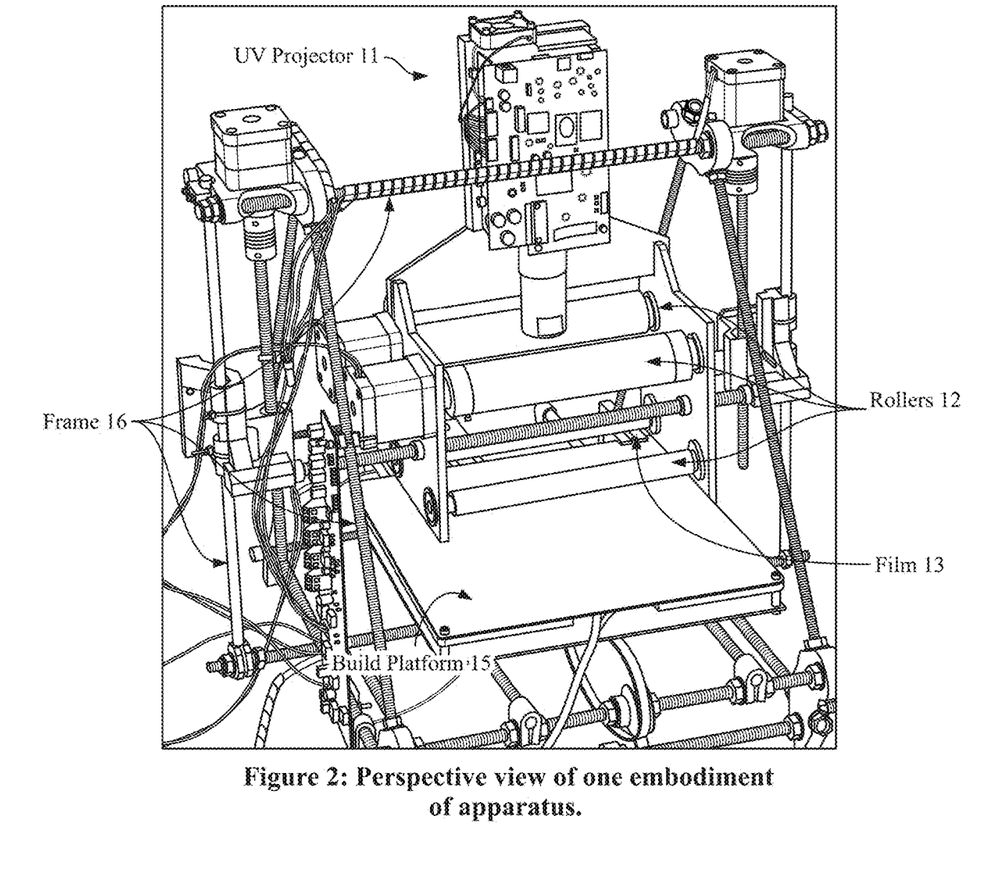
FIG. 2: Perspective view of one embodiment of apparatus.
Figure 3:
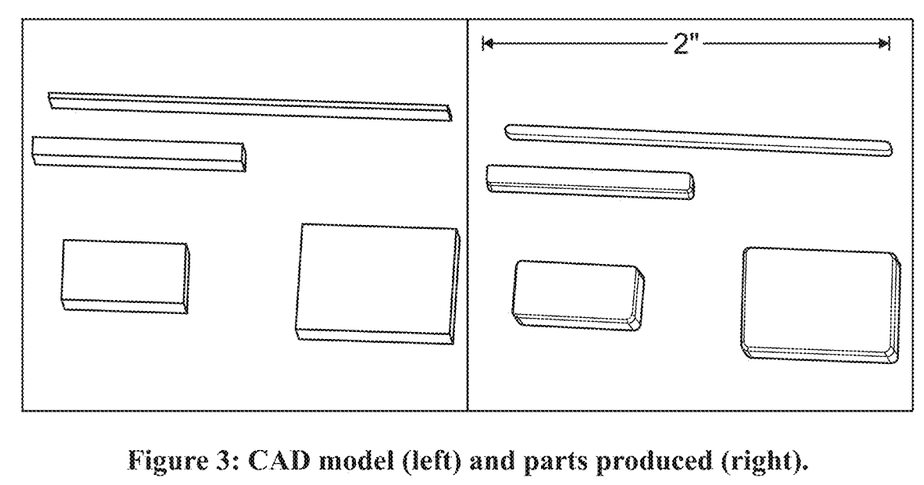
FIG. 3: CAD model (left) and parts produced (right).

A test fabrication was performed using the resin was carried out with the apparatus of Example 1, with a slice height of 100 microns and manual application of the resin to the film on each pass. Results are shown in FIG. 3. Not including manual resin application (which will be automated in future revisions and add minimal time), each layer took approximately 1.5 seconds (0.5 second exposure, 1 second move). With a slice height of 100 microns, this correlates to a fabrication speed of approximately 240 millimeters per hour.

Example 3

Mounting of Head Assembly to CNC Machine as Second Drive Assembly

A "head assembly" apparatus comprising a source of actinic radiation, belt to which polymerizable liquid is applied, applicator for applying the polymerizable liquid to the belt, and associated interconnecting frame, as described above, is mounted or retrofitted to a commercial vertical or horizontal CNC machine (which then serves as the second drive assembly) to provide high accuracy, long distance, travel in various axes over a working bed or carrier for the object. Examples of suitable CNC machines include, but are not limited to, the HAAS VF-2, VF-4, and VF-12/40 vertical CNC machines, and the HAAS EC-400 and EC-400 horizontal CNC machines, available from Haas Automation, Inc., 2800 Sturgis Rd., Oxnard, Calif., 93030 USA.

Example 4

Single and Multi-Pass Travel Paths

Figure 4:
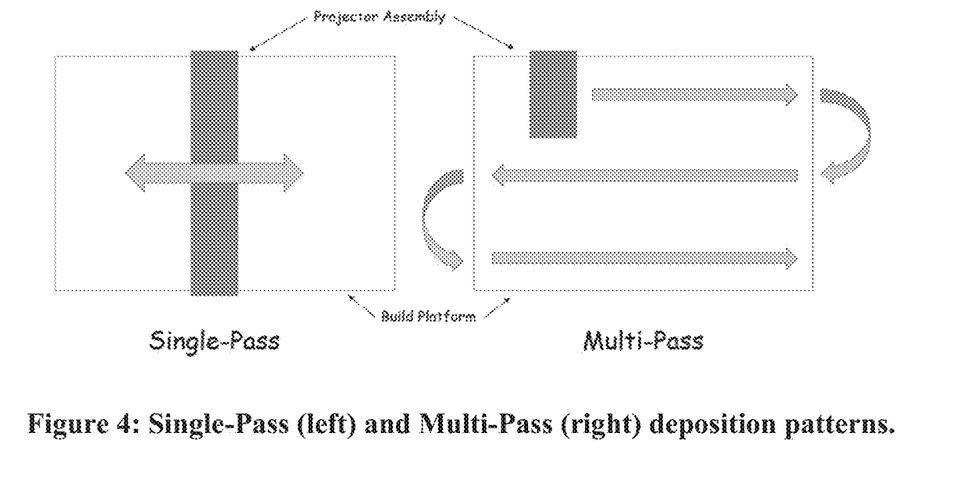
FIG. 4: Single-Pass (left) and Multi-Pass (right) deposition patterns.

In the example above, the head assembly spanned the entire depth of the build platform, and can deposit an entire slice in one pass across the platform (see FIG. 4). This will be referred to as single-pass deposition. Although this method provides excellent print speeds, it may become infeasible for very large build areas, or where very high-resolution projectors are used (as the number of projectors required would be high). In these situations, it may be desirable to switch to multi-pass printing, where the projector assembly is narrower, no longer spanning the entire build platform, and instead requires multiple passes across the build platform at different lateral positions to cover the entire build area. Of course, when printing cross-sections that do not span the entire build platform, fewer passes may be needed to cover the entire cross-section.

Example 5

Apparatus and Method with Co-Fabrication of Leading and Trailing Bumpers

Figure 5:
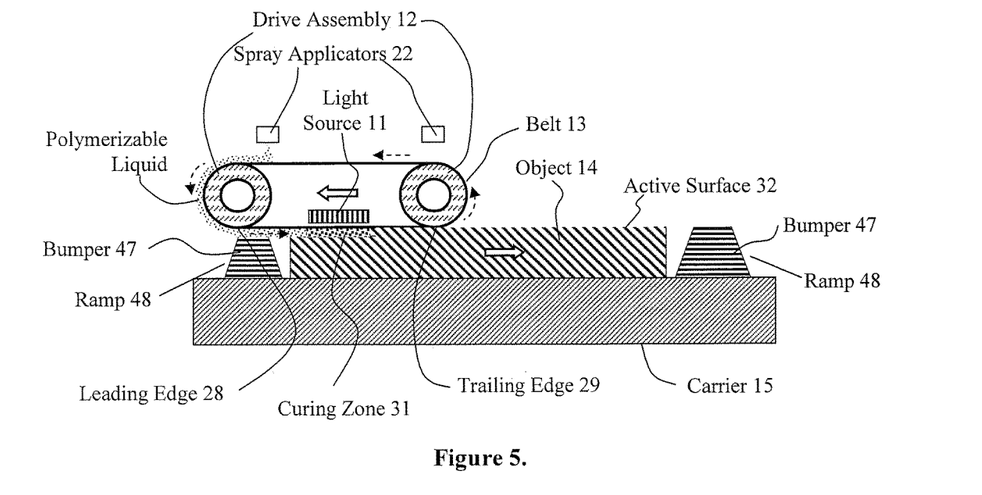
FIG. 5: Alternate embodiment of method and apparatus.
Figure 6:
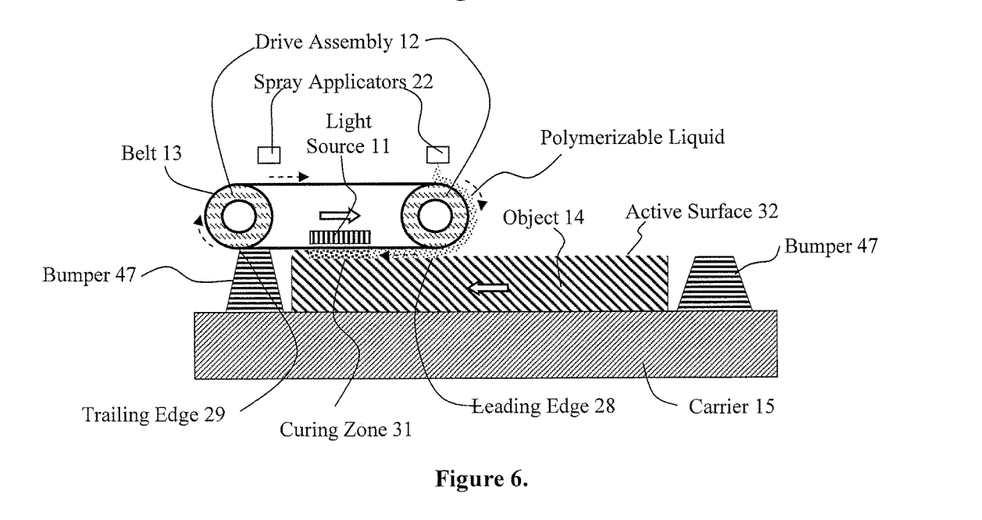
FIG. 6: Embodiment of FIG. 5 operating in reverse direction.
Figure 7:
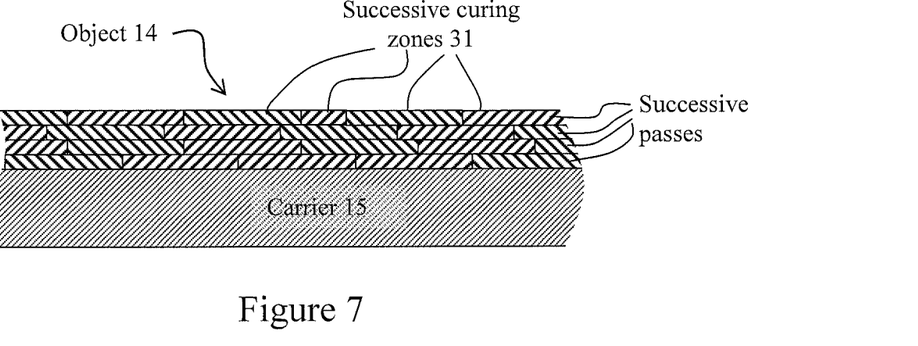
FIG. 7: Schematic illustration of offset curing zones in successive deposition passes.

An alternate embodiment of the invention, shown with a continuous belt 13, and as operating in both directions, is given in FIGS. 5-6, with FIGS. 6-7 representing two successive passes in opposite directions. A pair of rollers 12 serves as the drive assembly and carries the belt, which passes along leading edge 28 and trailing edge 29 defining a contact zone therebetween, a portion of which is positioned beneath a light source 11 which then defines a curing zone 31. The belt is made of an oxygen-permeable fluoropolymer. An LCD light panel 41, positioned adjacent the belt and having an associated ultraviolet light panel or source, serves as the patterned light source, yet space is provided for the back side of the belt to contact the atmosphere and allow atmospheric oxygen to pass therethrough. Polymerizable liquid is applied to the belt by one or the other of two sets of spray applicators 22 (e.g., ink jet cartridges), depending on the direction of travel. A pair of bumpers 47 are being produced, both incorporating ramps 48, and both optionally but preferably made from a different material than the object (applied to the belt in a spatially controlled manner from different orifices in the applicator assembly). Motion of the "head assembly" (the applicators, drive assembly, light source, and belt) relative to the object and carrier is illustrated by the open arrow within the belt in both Figures; corresponding motion of the carrier and object, relative to the head assembly, is shown by the other open arrow within the object. Dashed arrows show direction of travel of the belt. Vectors are matched so that, where the belt is in contact with the object, it is substantially motionless or static—that is, there is no slippage of the belt on the object. As the belt passes over the object, in either direction, there is preferably left behind an "active surface" 32 or "gradient of polymerization" (e.g., due to residual inhibitor therein), to which active surface the newly deposited polymerizable liquid may covalently bind. First and second drive assemblies are not shown, but note that these two may be consolidated together as an XYZ drive, or some may be existing drive components of a CNC machine, to which a "head assembly" comprised of the applicators, belt, light source, optionally additional drive components or at least rollers, all on a corresponding mounting frame, may be mounted or retrofitted.

Example 6

Offset Curing Zones in Successive Deposition Passes

As will be appreciated by the foregoing, each of the repetition of the deposition process increases the thickness of the growing object, pass-by-pass over the carrier and object. As schematically illustrated in FIG. 7, for each deposition pass the irradiation step may be carried out as a series of separate successive exposures, with different cross-hatching in each pass indicating successive separate exposures zones and curing zones. On subsequent passes or repeats, as the object is grown in thickness, the exposure zones in the current pass may be aligned with the exposure zones in the immediate previous pass. Or, in some embodiments, the exposure zones in subsequent passes may be staggered or offset (regularly or irregularly) from the exposure zones in the immediate previous pass. Staggering may be accomplished by any suitable means, including changing the width of one or more exposure zones at the beginning, end, or in-between portions of each pass (and combinations thereof).

The foregoing is illustrative of the present invention, and is not to be construed as limiting thereof. The invention is defined by the following claims, with equivalents of the claims to be included therein.

That which is claimed is:

1. A method of making a three-dimensional object, comprising:
   (a) providing an apparatus comprising a radiation source, a carrier on which said three dimensional object is made, and a movable belt positioned therebetween, said belt having a first surface and an opposite second surface, with said belt comprised of an optically transparent material, and with said belt permeable to a polymerization inhibitor;
   (b) applying a polymerizable liquid to said first surface of said belt, and contacting said second surface of said belt to said polymerization inhibitor;
   (c) contacting a portion of said belt first surface having said polymerizable liquid thereon to said carrier or said three dimensional object so that said belt adheres thereto with said polymerizable liquid positioned therebetween;
   (d) irradiating said polymerizable liquid with actinic radiation through said belt from said radiation source to polymerize the polymerizable liquid positioned therebetween, while: while:
      (i) moving said radiation source lengthwise across said substrate or said three-dimensional object;
      (ii) continuously adhering a leading edge portion of said belt to said carrier or said object;
      (iii) continuously peeling a trailing edge portion of said belt from said carrier or said object, with
      (iv) said polymerization inhibitor passing through said belt to form an active surface on said object, and optionally, a dead zone of unpolymerized liquid between said active surface and said polymerizable liquid; then
   (e) separating said belt from said carrier or said three dimensional object; and then (f) repeating steps (b) through (e) until said three dimensional object is completed, wherein said belt is electrostatically charged, and/or said applying step is carried out by electrospray.

2. The method of claim 1, wherein:

said moving belt is configured to pass through a contact region which contact region is in fixed contact with said carrier or said object, and said contact region has a length dimension less than that of said carrier or said object.

3. The method of claim 1, wherein said irradiating step is carried out with patterned actinic radiation.

4. The method of claim 1, wherein said apparatus further comprises a frame, with said belt and said radiation source connected to said frame, and with a said contact region defined by said frame.

5. The method of claim 1, wherein said belt is continuous.

6. The method of claim 1, wherein said belt is reversible in direction of travel.

7. A method of making a three-dimensional object, comprising:

(a) providing an apparatus comprising a radiation source, a carrier on which said three-dimensional object is made, and a movable belt positioned therebetween, said belt having a first surface and an opposite second surface, with said belt comprised of an optically transparent material, and with said belt permeable to a polymerization inhibitor;

(b) applying a polymerizable liquid to said first surface of said belt, and contacting said second surface of said belt to said polymerization inhibitor, (c) contacting a portion of said belt first surface having said polymerizable liquid thereon to said carrier or said three-dimensional object so that said belt adheres thereto with said polymerizable liquid positioned therebetween;

(d) irradiating said polymerizable liquid with actinic radiation through said belt from said radiation source to polymerize the polymerizable liquid positioned therebetween, while:

(i) moving said radiation source lengthwise across said carrier or said three-dimensional object;

(ii) continuously adhering a leading edge portion of said belt to said carrier or said object;

(iii) continuously peeling a trailing edge portion of said belt from said carrier or said object, with (iv) said polymerization inhibitor passing through said belt to form an active surface on said object, and optionally, a dead zone of unpolymerized liquid between said active surface and said polymerizable liquid; then (e) separating said belt from said carrier or said three-dimensional object; and then (f) repeating steps (b) through (e) until said three-dimensional object is completed, the method further comprising co-fabricating a sacrificial leading bumper and/or sacrificial trailing bumper with said object.

8. The method of claim 7, wherein:

said movable belt is configured to pass through a contact region which contact region is in fixed contact with said carrier or said object, and said contact region has a length dimension less than that of said carrier or said object.

9. The method of claim 7, wherein said irradiating step is carried out with patterned actinic radiation.

10. The method of claim 7, wherein said apparatus further comprises a frame, with said belt and said radiation source connected to said frame, and with a contact region defined by said frame.

11. The method of claim 7, wherein said belt is continuous.

12. The method of claim 7, wherein said belt is reversible in direction of travel.

\* \* \* \* \*

UNITED STATES PATENT AND TRADEMARK OFFICE
CERTIFICATE OF CORRECTION

PATENT NO. : 10,792,868 B2
APPLICATION NO. : 15/255752
DATED : October 6, 2020
INVENTOR(S) : Ermoshkin et al.

It is certified that error appears in the above-identified patent and that said Letters Patent is hereby corrected as shown below:

On the Title Page

(71) Applicant: Please correct "Carbon3D, Inc." to read -- Carbon, Inc. --

In the Claims

Column 16, Line 37, Claim 1: Please correct "three dimensional" to read -- three-dimensional --

Column 16, Line 48, Claim 1: Please correct "three dimensional" to read -- three-dimensional --

Column 16, Line 54, Claim 1: Please correct "while: while:" to read -- while: --

Column 16, Line 56, Claim 1: Please correct "substrate" to read -- carrier --

Column 16, Lines 66-67, Claim 1: Please correct "three dimensional" to read -- three-dimensional --

Column 17, Lines 1-2, Claim 1: Please correct "three dimensional" to read -- three-dimensional --

Signed and Sealed this
Second Day of March, 2021

Drew Hirshfeld
*Performing the Functions and Duties of the
Under Secretary of Commerce for Intellectual Property and
Director of the United States Patent and Trademark Office*